United States Patent [19]

Galumbeck

[11] Patent Number: 5,211,414
[45] Date of Patent: May 18, 1993

[54] WHEELCHAIR

[75] Inventor: Michael H. Galumbeck, Columbia, Md.

[73] Assignee: Regain, Inc., Columbia, Md.

[21] Appl. No.: 741,589

[22] Filed: Aug. 7, 1991

Related U.S. Application Data

[63] Continuation-in-part of Ser. No. 527,295, May 23, 1990, abandoned.

[51] Int. Cl.[5] .......................... B62M 1/14; B60T 1/00
[52] U.S. Cl. .................................. 280/250.1; 280/249; 280/242.1; 280/260; 297/345; 297/DIG. 4; 180/907; 188/82.7; 188/2 F; 188/82.3; 188/30; 188/31; 192/4 C
[58] Field of Search .................. 280/250.1, 249, 242.1, 280/237, 304.1, 243, 248, 255, 260; 297/345, DIG. 4; 180/907; 74/412, 414, 415, 417, 143; 188/82.7, 2 F, 82.2, 82.3, 30, 31, 69; 192/4 C

[56] References Cited

U.S. PATENT DOCUMENTS

| | | |
|---|---|---|
| 607,522 | 7/1898 | Noyes . |
| 2,397,790 | 4/1946 | Kapusta ............................... 74/143 |
| 4,231,614 | 11/1980 | Shaffer . |
| 4,380,343 | 4/1983 | Levell et al. . |
| 4,598,944 | 7/1986 | Meyer et al. . |
| 4,614,246 | 9/1986 | Masse et al. . |
| 4,625,984 | 12/1986 | Kitrell . |
| 4,685,693 | 8/1987 | Vadjunec . |
| 4,733,755 | 3/1988 | Manning ............................... 188/31 |
| 4,758,013 | 7/1988 | Agrillo . |
| 4,766,772 | 8/1988 | Tsuchie ............................... 280/255 |
| 5,037,120 | 8/1991 | Parisi .................................. 280/250.1 |

FOREIGN PATENT DOCUMENTS

| | | | |
|---|---|---|---|
| 8201314 | 4/1982 | Australia ...................... | 297/DIG. 4 |
| 0720851 | 2/1932 | France ............................ | 188/30 |
| 0776610 | 11/1980 | U.S.S.R. ......................... | 180/907 |

Primary Examiner—Margaret A. Focarino
Assistant Examiner—Paul Dickson
Attorney, Agent, or Firm—Sixbey, Friedman, Leedom & Ferguson

[57] ABSTRACT

A lightweight, optionally foldable wheelchair which allows the user maximum control over both travel direction and seat position. The wheelchair is driven manually by an arrangement of drive gears, which are actuated by a drive gear selector and operated by rotating a pair of opposed handwheels, one of which is contacted by each of the occupant's hands. One of four or more different gears may be selected, including a "Forward Only" and a "Reverse Only" gear, which allow travel only in the direction selected. A dual function shift lever supports the drive gear selector and may be activated to disengage the drive gears and engage a seat positioning gear. When the seat positioning gear is engaged, rotation of the handwheels by the wheelchair occupant will activate a seat raising mechanism which moves the seat from a horizontal sitting position to a substantially vertical position toward the rear of the wheelchair. The leg rests and foot rests fold and are engaged by the wheelchair frame so that they are guided away from the front of the chair, thus enabling the occupant to assume a standing position without changing the center of gravity of the chair.

46 Claims, 5 Drawing Sheets

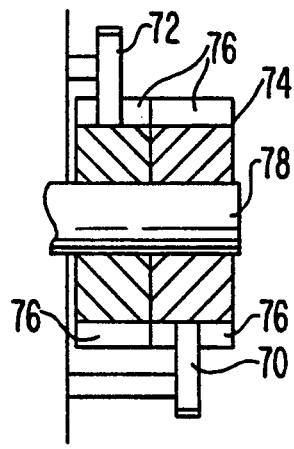
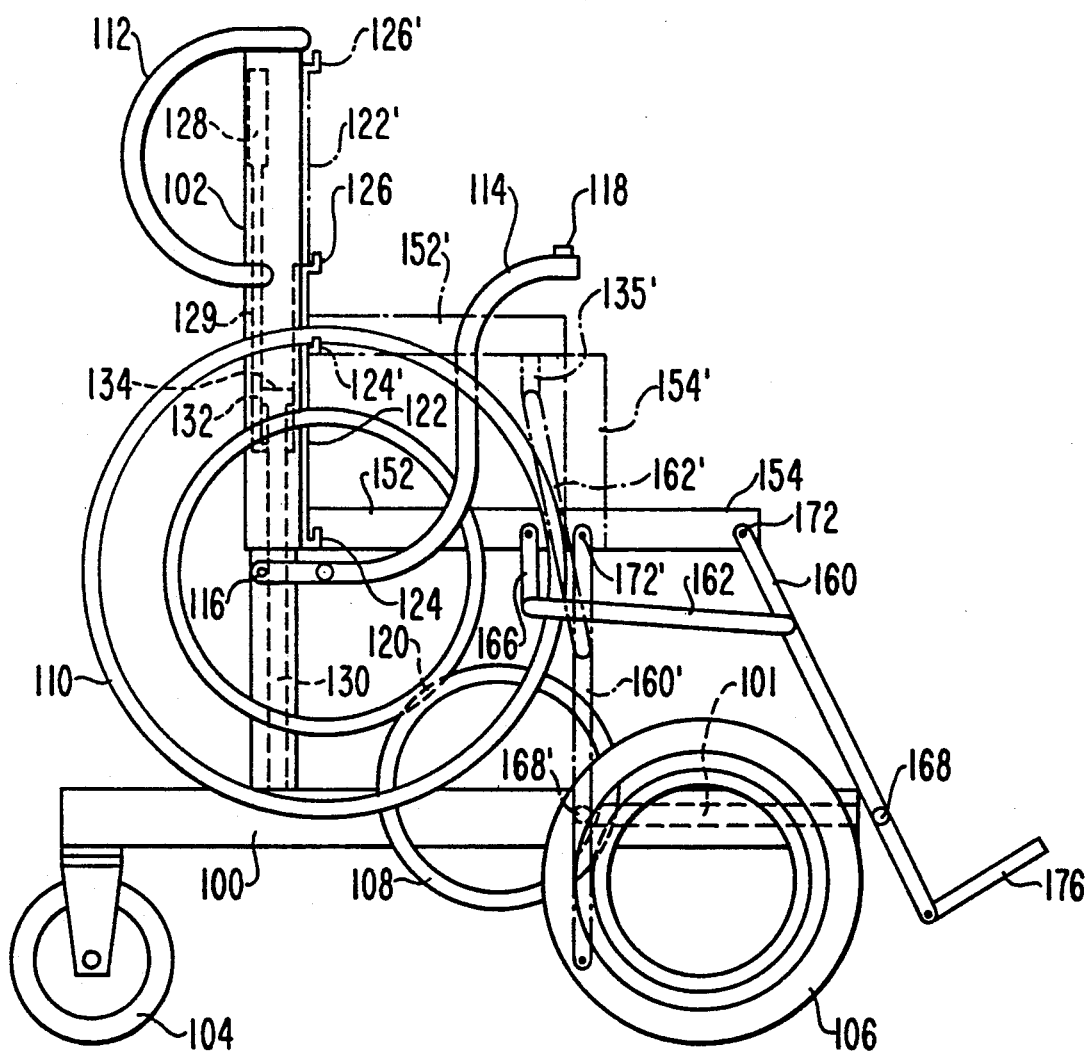

WHEELCHAIR

This application is a continuation-in-part of U.S. patent application Ser. No. 07/527,295 filed May 23, 1990, now abandoned.

TECHNICAL FIELD

The present invention relates generally to manually driven wheelchairs and specifically to a foldable manually driven wheelchair with a dual function drive geared to propel the wheelchair in forward and reverse directions and to change the level of the seat to permit the user to sit or to stand.

BACKGROUND OF THE INVENTION

Disabled persons who are confined to wheelchairs have often found their mobility and, hence, their activities limited by the capabilities of the wheelchairs available to them. The efforts of architects and planners to make public places and private spaces accessible to the wheelchair-bound can be thwarted by the limitations of the very wheelchairs on which the handicapped must depend for access to all parts of their environment. Currently, available wheelchairs include those that are motor driven and those that are driven manually. The high cost of motor driven wheelchairs, which are powerful enough to negotiate many different types of surfaces and terrains, puts them beyond the reach of large numbers of those who need them. The available manually driven wheelchairs, moreover, are often difficult to drive, especially up inclines, over curbs and on uneven terrain. In addition, the majority of these wheelchairs restrict the user to a sitting position. Those wheelchairs that enable their users to assume a standing position are expensive, complex and uncomfortable.

The design of currently available manually driven wheelchairs, moreover, presents many disadvantages and limitations. Two large drive wheels, which are usually positioned on each side near the center of gravity of the wheelchair, support the wheelchair and contact the ground, floor or other base surface on which the wheelchair rests. These large wheels are moved by the user's hands to propel the wheelchair in the direction desired. Smaller, pivoting front wheels allow the user to control the direction of travel of the wheelchair by varying the energy directed to the right or left large drive wheel. This system may work reasonably well on smooth flat surfaces. However, the small pivoting front wheels do not maneuver the wheelchair well up curbs or over large bumps, requiring the user to obtain assistance to travel over these obstacles. In addition, as the forward speed of the wheelchair increases, the pivoting front wheels make steering more difficult. Finally, because the user must usually contact the large drive wheel directly to propel the wheelchair, the user's hands and clothing are easily dirtied during travel, particularly during inclement weather and during travel over dirty or undesirable surfaces.

The available options for improving the suspension and, thus, the smoothness of travel of manually operated wheelchairs are limited. Moreover, maximum user control of travel is often sacrificed in favor of improving the suspension. As a result, the user may be required to choose between a smooth riding wheelchair and a wheelchair that he or she can control more easily.

The gearing and braking of a direct drive manual wheelchair is cumbersome and complicated by the chair's design. Unfortunately, because of this, the user's range of travel without assistance may be severely limited. For example, a ramp with an incline of more than 5 to 7 degrees will require the wheelchair user to obtain assistance to negotiate this incline successfully. In addition, obstacles like curbs are virtually impossible to negotiate with the existing gearing and braking systems used on most manually driven wheelchairs without assistance. This need for assistance, moreover, limits the wheelchair user's independence.

The prior art includes a large number of different types of manually driven wheelchairs. Those described in U.S. Pat. Nos. 4,231,614 to Shaffer; 4,380,343 to Lovell et al.; 4,614,246 to Masse et al.; and 4,625,984 to Kitrell are illustrative of these many prior art designs. The patents to Lovell et al. and Kitrell disclose wheelchairs driven by hand wheals which are manually rotated by the user to drive separate drive wheels to propel the chair. Although these arrangements allow the wheelchair occupant to avoid dirtying his or her hands or clothing since the hand wheel does not directly contact the ground or other travel surface, the chain drives and belt drives used to drive these chairs do not overcome the travel limitations posed by manually driven wheelchairs. The occupant is not able to negotiate inclines or obstacles more easily or without assistance with the wheelchairs disclosed in these patents.

The wheelchairs disclosed by Masse et al. and Shaffer have stationary front wheels and pivoted back wheels. While this design provides some improvements in maneuverability, the wheelchair user still must rely on assistance from others for complete mobility with the wheelchairs described in these patents. The aforementioned prior art, therefore, does not provide a manually driven wheelchair which allows the user substantially complete mobility without assistance.

To allow the wheelchair user virtually unlimited mobility, the chair should support the user adequately in a sitting position for travel. The chair should, in addition, permit the user to assume a standing position supported as needed by the wheelchair in a manner that permits the user to use and, thus, strengthen those parts of the body which he or she is capable of using. Wheelchairs that adjust to support the occupant in both a sitting and a standing position are known. For example, the wheelchair disclosed in U.S. Pat. No. 4,809,804 to Houston et al. achieves this objective. However, the seat assembly in this patent is a complex, motor driven apparatus that leaves the occupant in an extremely uncomfortable upright position in which he has only limited mobility. Moreover, the center of gravity changes as the chair moves from a sitting to a standing position so that the wheelchair is not as stable as it should be to support a disabled person in an unaccustomed position. The prior art, therefore, does not disclose a manually operated wheelchair which can be easily adjusted manually to support the occupant in either a sitting or a standing position so that the occupant has maximum mobility in both positions.

Consequently, a need exists for a simple, manually driven wheelchair which does not limit the mobility of the occupant, but which permits the occupant to negotiate unassisted almost any type of terrain or travel surface likely to be encountered. A need also exists for a manually driven wheelchair which can be easily adjusted by the user to support the user in either a sitting or a standing position so that the center of gravity does not change during the shift from a sitting to a standing position, but remains the same to provide maximum stability to the chair and, hence, the occupant.

SUMMARY OF THE INVENTION

It is a primary object of the present invention, therefore, to overcome the disadvantages of the prior art and to provide a manually driven wheelchair which affords the user maximum mobility of travel and position without assistance.

It is another object of the present invention to provide a manually driven wheelchair which is easily driven by the user without assistance over different types of terrain and travel surfaces.

It is yet another object of the present invention to provide a manually driven wheelchair including a dual function drive mechanism which can be manually actuated by the occupant both to drive the wheelchair in a selected gear and to change the position of the occupant from sitting to standing.

It is still another object of the present invention to provide a gearing and braking mechanism for a manually driven wheelchair which prevents the wheelchair from drifting backward when the wheelchair is being driven up an inclined surface.

It is a further object to provide a manually driven wheelchair that is easily moved manually by the occupant between a sitting and a standing position so that the center of gravity does not change.

It is a further object of the present invention to provide a wheelchair that allows its user to move from a sitting position to a comfortable, fully supported standing position.

It is yet a further object of the present invention to provide a manually driven wheelchair with a handwheel actuated arrangement of gears that is easily activated to drive the wheelchair in a desired direction of travel.

It is a still further object of the present invention to provide a manually driven wheelchair including a frame which is both adjustable for optimal user fit and foldable for maximum user convenience.

The aforesaid objects are achieved by providing a lightweight, foldable manually driven wheelchair with a pair of opposed hand-operated dual function drive wheels connected through a drive gear to a pair of opposed non-pivoted travel wheels which support the front of the wheelchair on the ground or other travel surface. A pair of pivoted, non-driven travel wheels supports the rear of the wheelchair. Two opposed vertical seat support bars support the drive wheels, seat, seat back and leg rest of the wheelchair, while a pair of base bars perpendicular to the seat support bars support the drive gear and the travel wheels. A single hand operated shift lever and gear control is provided on one side of the chair to permit the user to change the drive gears easily and to actuate seat movement means to move the seat from a sitting to a standing position. The drive gearing is designed to prevent backward movement when the wheelchair is engaged in a forward drive gear and forward movement when the wheelchair is engaged in a reverse drive gear. The base bars are connected by telescoping cross bars to permit adjustment of the chair width to the user's body and are hinged to allow the chair to be folded when not in use.

Other objects and advantages will be apparent from the following description, claims and drawings.

BRIEF DESCRIPTION OF THE DRAWINGS

FIG. 3 is an end view of part of the gearing system mounted in place on the wheelchair frame;

FIG. 4 is a schematic side view of the wheelchair frame showing the seat positioning mechanism;

DESCRIPTION OF THE PREFERRED EMBODIMENTS

A primary objective of the present invention is to provide a wheelchair that does not present additional limitations to those persons whose health or physical disabilities confines them to this device. Handicapped persons are encouraged by their physicians, physical therapists and, increasingly, by the public at large to expand their horizons and to participate in many activities once thought to be beyond the reach of the handicapped or disabled. Unfortunately, many of those who want to become more active are limited significantly by the wheelchairs in which they are confined so that they do not have the physical mobility which enables them to exercise control over their environment. The present invention provides a versatile, lightweight manually driven wheelchair that is easy to manufacture and, therefore, less expensive than motor driven wheelchairs. The present wheelchair, moreover, allows the occupant complete control over the travel of the wheelchair and, in addition, permits the occupant to change him- or herself from a sitting to a standing position without assistance. As a result, the wheelchair of the present invention affords the user substantially more freedom and mobility than currently available wheelchairs and permits a measure of independence not heretofore achieved with manually operated wheelchairs.

Figure 1:
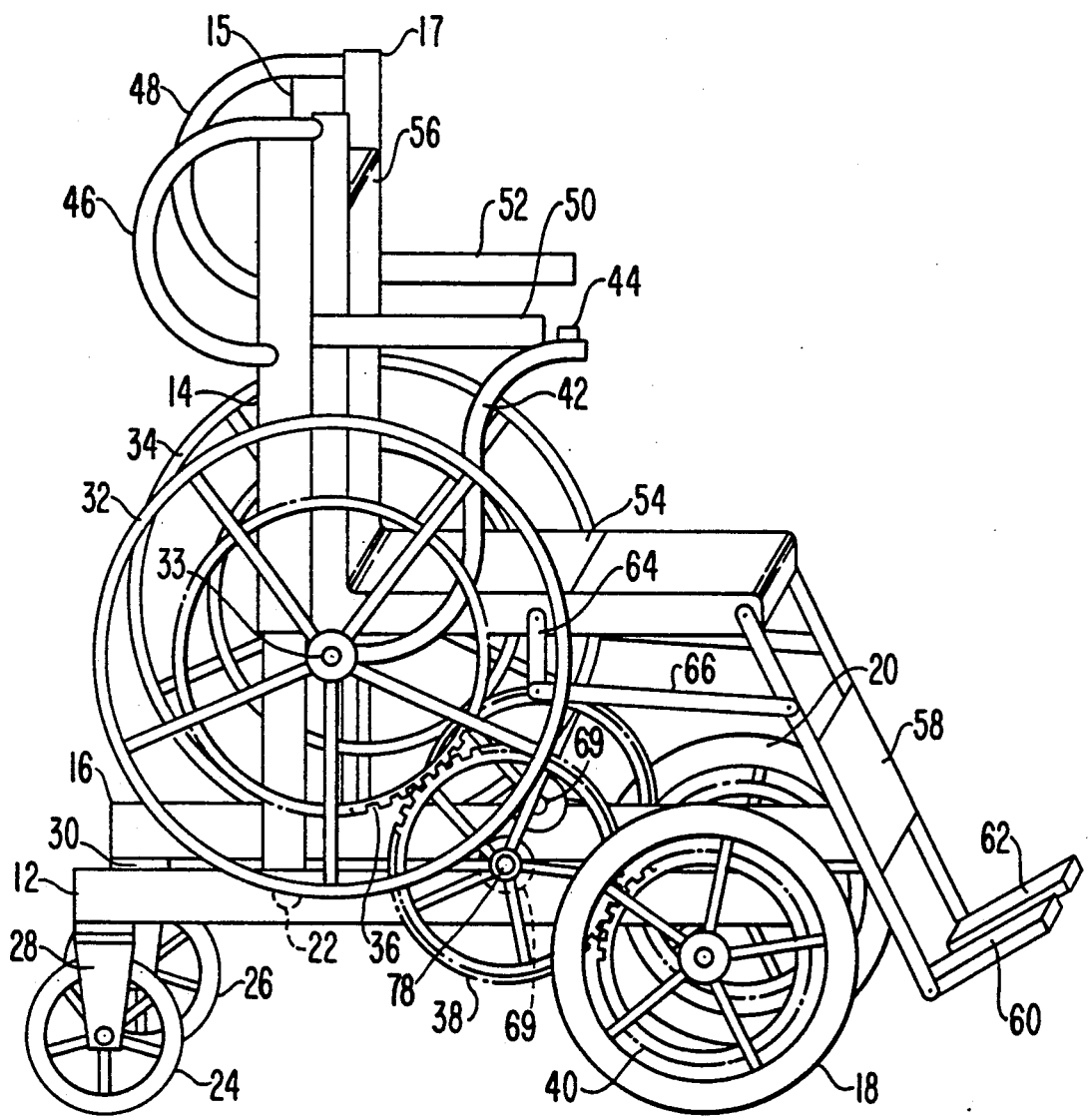
FIG. 1 is a side view of the wheelchair of the present invention.

Referring to the drawings, FIG. 1 illustrates, in side view, the wheelchair 10 of the present invention. The main supporting frame has a very simple inverted letter "T" shape and includes a base bar 12, which is the top of the "T", and a seat support bar 14 perpendicular to the base bar, which is the stem of the "T". The seat support bar 14 is secured to the base bar 12 at a point that is offset from the center toward the rear of the wheelchair and corresponds to the center of gravity of the chair to provide adequate space for the drive gears, as will be discussed in detail hereinbelow. A second base bar 16 and a second seat support bar 17 are joined to bars 12 and 14 by a pair of cross bars (not shown). One cross bar extends between the base bars 12 and 16 near the centers of the front wheels 18 and 20. The second cross bar, one end 22 of which is shown in dashed lines on the base bar 12, is located at the intersection of the base bar and the seat supported bar, so that it is substantially aligned with the center of gravity of the chair.

This basic frame is preferably constructed of a lightweight material, such as aluminum, that is also durable and heavy enough to provide stability to the wheelchair. The frame may be made to be adjustable by telescoping the cross bars so that the distance between the wheelchair base bars and seat support bars which make up the side frames can be varied according to the size of the wheelchair occupant. The ability to adjust the chair's width to the person's width as described allows custom fit at low cost and can significantly enhance the comfort of the chair. In addition, the cross bars may be hinged to make the wheelchair frame foldable.

Unlike many currently available manually driven wheelchairs, the front wheels 18 and 20 are non-pivoting and are mounted near each end of one of the cross bars (not shown). The rear wheels 24 and 26 are pivotally mounted to wheel brackets 28 and 30, respectively, at the rear end of base bars 12 and 16. The non-pivoting front wheels 18 and 20, which are larger than the pivoting rear wheels 24 and 26 are positively driven and thus allow the user more control over steering and greater maneuverability than has been heretofore possible with manually driven wheelchairs.

The wheelchair of the present invention employs a drive mechanism that differs significantly from those typically found on manually driven wheelchairs. A pair of handwheels 32 and 34 are rotatably mounted on the seat support bars, one on the right bar 14 and one on the left bar 17. These handwheels are grasped and turned by the wheelchair occupant to drive the chair. The handwheels 32 and 34 do not touch the ground or travel surface of the wheelchair; nor do they contact indirectly any structure that contacts the wheelchair travel surface. Therefore, these wheels stay much cleaner than if they did contact the travel surface, either directly or indirectly. Manually operated wheelchairs currently in use have a combined drive wheel/travel wheel, which is grasped and pushed by the user to move the chair. As a result, any dirty or undesirable surfaces over which the wheelchair travels are contacted directly by this type of handwheel and, hence, by the user's wrist or sleeves. The present design avoids this so that the user is not required to reach over a dirty wheel with his or her hands to move the wheelchair.

The handwheels 32 and 34 are drivingly connected through a series of drive gears to the wheelchair front wheels 18 and 20. The drive gear mechanism will be explained primarily in connection with the right handwheel 32 and the right front wheel 18; however, the drive gear mechanism operates in the same manner on the left side. The handwheel 32 includes a toothed drive gear 36 which is spaced inwardly toward the center 33 of handwheel 32. The handwheel drive gear 36 engages a toothed central drive gear 38, which is rotatably mounted on the base bar 12. The central drive gear 38 provides a driving connection between the handwheel 32 and a toothed wheel drive gear 40 located on the front wheel 18. A shift lever 42 includes a gear selector knob 44 which may be actuated to change gears in a manner which will be explained in detail below.

The wheelchair 10 of the present invention also includes a pair of handles 46, 48 which can be used to push the chair, if necessary, and also to provide a convenient handgrip for someone folding the chair. Arm rests 50, 52 are preferably attached to each of the seat support bars at a convenient height for supporting the occupant's arms. A padded seat 54 and back rest 56 are secured between the seat support bars and are configured to support the user's body in both a sitting and a standing position, as will be explained in detail hereinbelow. A leg rest 58, which is also preferably padded, is pivotally connected to the seat 54 and terminates in two folding foot rests 60, 62.

The leg rest 58 is secured to a leg rest bracket 66, which is pivoted to the end of a seat extension bracket 64 secured to the seat 54. These connections support the leg rest in an optimum position and allow it to be pivoted toward the back of the wheelchair, as will be discussed in connection with FIGS. 8 and 9, when the chair is moved from a sitting to a standing position.

The travel direction of the present wheelchair can be easily and effectively controlled by the user in a manner which allows the user maximum self-sufficiency. FIGS. 2a-2e illustrate the different gears which may be selected by the wheelchair user to control travel of the wheelchair. The gear selector knob 44 on shift lever 42 is designed to be turned clockwise by the user to the desired gear selection. Preferably, four gear selections are included: drive, forward, reverse, and park. However, additional gears could also be included, for example, one or more low gears. A conventional differential (not shown) is mounted in a convenient location on the wheelchair to transmit the gear selection, preferably through suitable cables, to the appropriate gear structures.

Preferred for use with the present invention is the arrangement of cams, ratchet gear and pawls shown in FIGS. 2a-2d and 3. This gear mechanism 69 is mounted on the shaft 78 that supports the central drive gear 38 on the opposite side of the base bar from the central drive gear 38. The gearing for only one side of the wheelchair is described; however, both the right and left gear mechanisms are identical.

Each gear mechanism 69 includes a selector plate 71 and two pivotally mounted curved spring biased pawls 70 and 72, respectively on stationary shafts 73 and 75. The configuration of the selector plate 71 is selected to permit the plate to rotate relative to the pawls 70, 72 and their springs 84, 86 which do not rotate with the gear selector plate 71. One useful configuration is the ring or "donut" shape shown in FIGS. 2a-2d. The gear selector plate 71 could also be formed form a solid plate with slots (not shown) to receive the pawl support shafts 73, 75 and springs 84, 86 sized to permit the required rotation of cams 80, 82. The pawls 70 and 72 are mounted relative to each other so that pawl 70 is forward of pawl 72. Pawl 70 is referred to as the "front" pawl, while pawl 72 is referred to as the "rear" pawl. Shafts 73 and 75 are different lengths to pivotally mount the pawls 70 and 72 at different elevations relative to a central ratchet gear 74, as will be explained in detail in connection with FIG. 3.

A central ratchet gear 74 which is keyed to the shaft 78 that supports the central drive gear 38, is located in the center of the gear mechanism and includes a plurality of angled curved teeth 76, 77 that extend around the circumference of the ratchet gear. These teeth are arranged in two stacked circumferential rows as described in connection with FIG. 3. Only the row of teeth 76 can be seen in FIGS. 2a-2d. The row of teeth 77 is located directly below teeth 76. The selector plate 71 is mounted for rotation relative to central shaft 78, which supports the central drive gear 38.

Figure 2A:
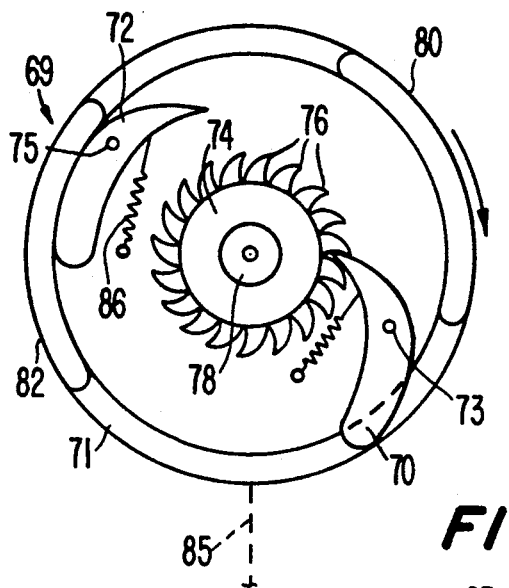
FIGS. 2a-2e illustrate the gearing and gear selector positions of the present invention.
Figure 2B:
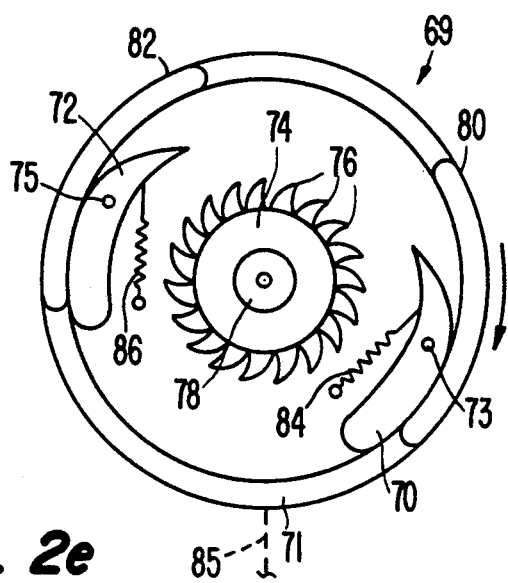
Figure 2E:
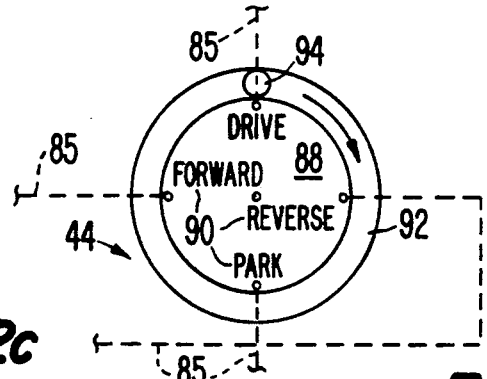

The selector plate 71 includes two cams 80 and 82 which are rotated in a clockwise direction with the selector plate in response to the rotation of the gear selector knob 44, shown in detail in FIG. 2(e). The gear selector knob is connected to the gear mechanism 69, specifically to the selector plate 71, through suitable cables and a conventional gearing or differential shown in dashed lines 85. The differential holds the selector plate 71 stationary once a gear has been selected so that the pawls 70, 72 are held in the required positions while the wheelchair is in the selected gear.

Figure 2C:
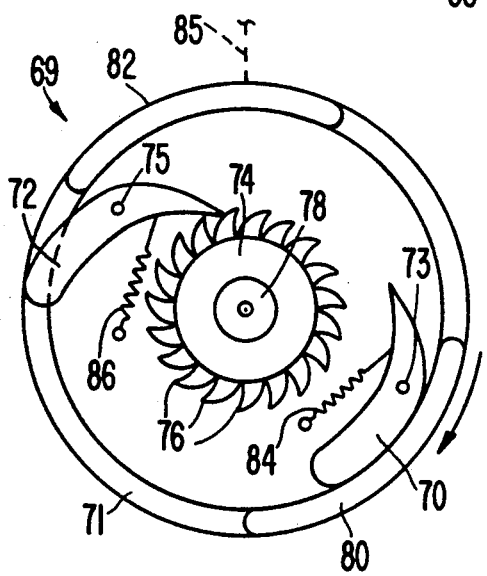
Figure 2D:
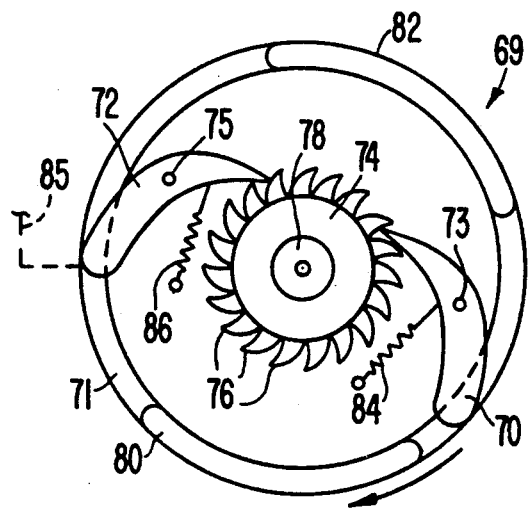

The curved pawls 70, 72 are normally spring biased by springs 84, 86 to engage the curved teeth 76, 77 of the ratchet 74 to assume the positions shown in FIG. 2d, which is "Park". However, when the gear selector knob is rotated to select a gear other than "Park", the selector plate 71 and cams 80, 82 rotate, and one or both pawls 70, 72 may be caused to pivot out of engagement with the teeth 76, 77 by the cams. This arrangement allows limitation of the travel direction of the wheelchair to a "Forward Only" or to a "Reverse Only" mode.

FIG. 2a illustrates the relative positions of the pawls 70 and 72 when the gear selector knob has been turned to the "Forward Only" position. Both the gear selector knob and the selector plate 71 always rotate only clockwise. In the "Forward Only" position, the front pawl 70 is spring biased to engage the ratchet gear teeth 76, and the rear paw 72 is pushed out of engagement with the teeth 77 by contact with cam 82.

The front travel wheels 18, 20 must rotate in a clockwise direction to move the wheelchair forward. To accomplish this, the wheelchair occupant must move the handwheels 32, 34 clockwise. The clockwise movement of the handwheel is transmitted to the central drive gear 38, which must then rotate counterclockwise to drive the travel wheel 18 in a clockwise, or forward, direction. The ratchet gear 74 is rotatably mounted on shaft 78 and thus rotates counterclockwise with the central drive gear 38.

If the wheelchair is caused to move in a reverse direction, the direction of rotation for the handwheel 32, central drive gear 38 and the front travel wheel 18 would have to be reversed so that the travel wheel and handwheel would be rotating counterclockwise, and the central drive gear and ratchet gear 74 would then rotate clockwise. However, when the gear mechanism is in the "Forward Only" position of FIG. 2a, the clockwise rotation of the ratchet gear 74 will be prevented by the engagement of pawl 70 in the teeth 76. It will be noted from FIG. 2a that the ratchet gear teeth 76 are curved toward the pawl 70 so that when the ratchet gear 74 rotates counterclockwise, the pawl can skip over the teeth 76 without fully engaging them. The clockwise rotation of the ratchet gear 74, however, will cause the pawl 70 to be fully engaged by the teeth so that the ratchet gear cannot rotate. Because the ratchet gear is mounted to drive the central drive gear 38, the central drive gear will also be prevented from rotating clockwise. As a result, neither counterclockwise rotation of the handwheels nor counterclockwise rotation of the travel wheels can cause the wheelchair to move in a reverse direction.

When the gear is in the "Forward Only" position, the wheelchair can only be propelled in a forward direction and cannot be moved in a reverse direction because the central drive gear 38 is prevented from rotating clockwise. Therefore, if the occupant is maneuvering the chair up a ramp or other incline and must stop before reaching the top, the chair will not roll backward. This is in distinct contrast to prior art manually driven wheelchairs, which would drift back down the ramp or incline because they do not have gearing or like mechanisms to limit the direction of travel.

FIG. 2b illustrates the positions of the pawls, ratchets and cams when the gear selector is in the "Drive" position shown in FIG. 2e. When the "Drive" gear is selected, the cams 80 and 82 are rotated so that both pawls 70 and 72 are moved out of engagement with the ratchet gear teeth 76, 77 by the cams. Because neither of the pawls 70, 72 is engaged by the ratchet gear teeth 76, 77 the ratchet gear 74 and the corresponding central drive gear 38 can rotate both counterclockwise and clockwise. Consequently, the wheelchair will move in both forward and reverse directions, and the rearward travel of the wheelchair is not prevented, as in the FIG. 2a gear configuration. This gear is especially suitable for forward travel on relatively flat surfaces.

FIG. 2c illustrates the "Reverse Only" gear. Rotation of the gear selector knob to this gear moves the front pawl 70 out of engagement with the teeth 76 by cam 80, while the rear pawl 72 is not contacted by cam 82. Spring 86 is then able to bias pawl 72 into engagement with the teeth 77 of the ratchet gear 74. Movement of the wheelchair in a reverse direction requires the counterclockwise rotation of the handwheel 32 and travel wheel 18. The central drive gear 38 must then rotate clockwise. To prevent the forward movement of the wheelchair when the "Reverse Only" gear is selected, the counterclockwise rotation of the central drive gear 38 must be prevented. This is accomplished by providing a second circumferential row of gear teeth 77 on ratchet gear 74 which are curved to allow the rear pawl 72 to skip over the teeth as the ratchet gear 74 rotates clockwise, but to be positively engaged by the teeth if the ratchet gear is rotated counterclockwise. FIG. 3 illustrates in more detail the dual rows of oppositely curved teeth 76 and 77. When this gear is selected, the wheelchair can only travel in a reverse direction. If the wheelchair user wants to travel backward up an incline, the chair will not drift forward when the drive mechanism is in this gear.

FIG. 2d illustrates the gear position when "Park" has been selected. In this position, neither cam 80 nor cam 82 contacts a pawl, and both pawls 70, 72 are biased by their respective springs 84, 86 into engagement with the ratchet teeth 76, 77. The wheelchair, therefore, will not travel either forward or backward when the handwheels 32, 34 are pushed by the occupant because the ratchet gear 74 and, thus, the central drive gear 38 are prevented from rotating either clockwise or counterclockwise.

FIG. 2e illustrates the details of one preferred type of gear selector knob 44, which is preferably located on top of the shift lever 42 (FIG. 1). A central panel 88 includes identifying indicia 90 showing the four gears. An outer rotating selector 92 including an indicator knob 94 is provided to enable the user to turn the selector clockwise to indicate the gear desired. The selector is in the "Drive" position in FIG. 2e.

FIG. 3 illustrates the spatial relationship between the front pawl 70 and the rear pawl 72 relative to the two stacked circumferential rows of teeth 76 and 77 in the gear mechanism 69. The front pawl 70 is pivotally mounted on shaft 73 to contact the outer or top row of teeth 76 on the ratchet gear 74. The rear pawl 72 is pivotally mounted on shaft 75 to contact the inner or bottom row of teeth 77. Therefore, shaft 73 must be longer than shaft 75 to position the pawls at the optimum positions for engaging the ratchet gear teeth.

The drive gear system shown and described in connection with FIGS. 2a-e and 3 may be modified to provide the wheelchair user additional control over the travel speed of the wheelchair. For example, one or more low gears could be provided to allow the user the capability to slow the speed of the chair when desired. A gear with braking could be used for this purpose. Other speed-varying gears could be employed as well to expand further the travel capacity of the wheelchair.

Not only does the gearing system of the present wheelchair provide the user substantially complete control over the travel direction of the wheelchair, but this system also controls the position of the seat. The wheelchair user can simply operate a single shift lever to actuate the mechanism that controls the travel of the chair and that changes the position of the seat. FIG. 4 illustrates, schematically, these control mechanisms. Only one side of the chair, the right side, is shown in FIG. 4. However, the seat position control system could also be located on the left side of the wheelchair. Ideally, the side on which the shift lever and controls are located will be selected based upon whether the user is right-handed or left-handed or must have the controls located on one side or the other to enable him or her to operate the gearing system effectively.

The wheelchair structures shown schematically in FIG. 4 correspond to those similar structures shown in FIG. 1. The wheelchair frame includes a base bar 100 and a seat support bar 102, which support the gearing system and controls, as well as the seat and leg rest, which are not shown in FIG. 4. The base bar 100 supports the pivoted rear travel wheel 104 and the non-pivoted front travel and gear wheel 106 and the central drive gear wheel 108. The seat support bar 102, which is also supported by the base bar 100, supports the handwheel 110, a handle 112, and a shift lever 114. The shift lever 114 is mounted on the seat support bar about a pivot point 116, which allows the shift lever to be moved downwardly or upwardly relative to the wheelchair travel surface.

The shift lever also includes a gear selector knob 118, such as that shown in FIG. 2e. The drive gearing mechanism 69 shown and discussed in connection with FIGS. 2a-2e and 3 is operatively rotatably mounted on the base bar on the same shaft as the central drive gear wheel 108 (wheel 38 in FIG. 1) at 109 so that the gear selector knob 118 can be easily manipulated by the wheelchair user to actuate the drive gear selected.

The shift lever 114 performs a dual function and can be manipulated by the wheelchair user to actuate the mechanism that automatically moves the seat, leg rest and foot rests out of the way so that the user can change his or her position from sitting to standing without changing the center of gravity of the wheelchair. This is accomplished by moving the shift lever 114 upwardly, which simultaneously moves the handwheel gear 120 from contact with the drive gear wheel 108. A vertical motion selector structure (not shown) is preferably included on the shift lever at a convenient location near the gear selector knob. Movement of the handwheel after its disengagement by the shift lever 114 will not move the wheelchair in a horizontal travel direction. When the shift lever is lifted to disengage the handwheel 110 from the travel gearing system, the handwheel simultaneously engages a seat positioning gear (FIGS. 6 and 7), which raises or lowers the seat in response to movement of the handwheel 110.

A seat slide 122 is attached to the seat support bar so that it can slide between predetermined upper and lower points on the seat support bar. A pair of seat support pins 124, 126 is provided on the seat slide to hold the wheelchair seat 152, which is preferably removable. The seat slide 122 is shown in FIG. 4 in the position it assumes when the seat 152 is in the optimum sitting position. Movement of the handwheel 110 will raise the seat slide so that the seat support pins occupy the positions shown in dashed lines at 124' and 126', the seat is in the position shown in dashed lines at 152, and the seat slide is in the position shown in dashed lines at 122'.

When the seat 152 is in the raised position shown in dashed lines 152', the front section 154 pivots downwardly to the position shown in dashed lines 154'. The leg rest 160, which is pivoted to the seat front section 154 at 172 is pulled toward the rear of the seat when the seat is raised and causes the seat to pivot downwardly. A leg rest bracket 162 pivoted to a seat bracket 166, which supports the leg rest when the seat is in the sitting position, assumes the positions shown in dashed lines 162' and 166' when the seat 152 is raised. The movement and positions of the seat front, leg rest, foot rest, and brackets are described below in more detail in connection with FIGS. 8 and 9. The leg rest 160 includes a knob 168 which may be used to adjust the leg rest, as described below, but which also guides the leg rest out of the wheelchair user's way when the seat is raised to a standing position. The knob 168 is received in a channel 101 in the base bar 100 so that it can slide within the channel as required to allow the leg rest 160 and leg rest bracket 162 to move from the sitting to the standing position and back to the sitting position.

When the wheelchair seat is in the sitting position shown in FIG. 1 and in solid lines in FIG. 4, the occupant is fully supported in a sitting position so that most of his or her body weight is borne by the seat, although the leg rest and foot rests can also provide some support, if needed. Because most persons who use wheelchairs are generally unable to stand unassisted, the design of the present wheelchair provides support for the user when the chair is in a standing position. The articulated seat has been designed so that the rear seat portion 152 remains perpendicular to the wheelchair back when the front section 154 and leg rest drop back, and the height of this rear seat portion 152 can be controlled by the user by turning the handwheel 110. The height of the seat portion 152 can be adjusted so that it is just under the user's buttocks.

Depending upon his or her degree of mobility or if the user is unable to assume a completely vertical position, the seat rear section 152 will function as a support for the user's buttocks and lower extremities. A seat belt around the user's waist may be required in some cases. Locating supporting structure at this part of the body instead of providing the chest straps used by currently available wheelchairs enables the wheelchair user to assume a substantially more comfortable, yet secure standing position. Moreover, unlike with the prior art wheelchairs, each individual wheelchair user can, unassisted, manually move the chair from a sitting position to a standing position and can additionally adjust the rear seat section to the optimum height for providing maximum support.

When it is desired to lower the seat so that the seat slide 122 is in the position shown in solid lines, the wheelchair user merely turns the handwheel 110 in the opposite direction. The seat front section 154 and leg rest 160 will then return to the solid line positions shown in FIG. 4. Once the seat is fully lowered, downward movement of the shift lever 114 by the wheelchair user will disengage the handwheel from the seat positioning gears and engage the handwheel with the travel wheel drive gears so that the wheelchair is again ready for horizontal travel.

Figure 6:
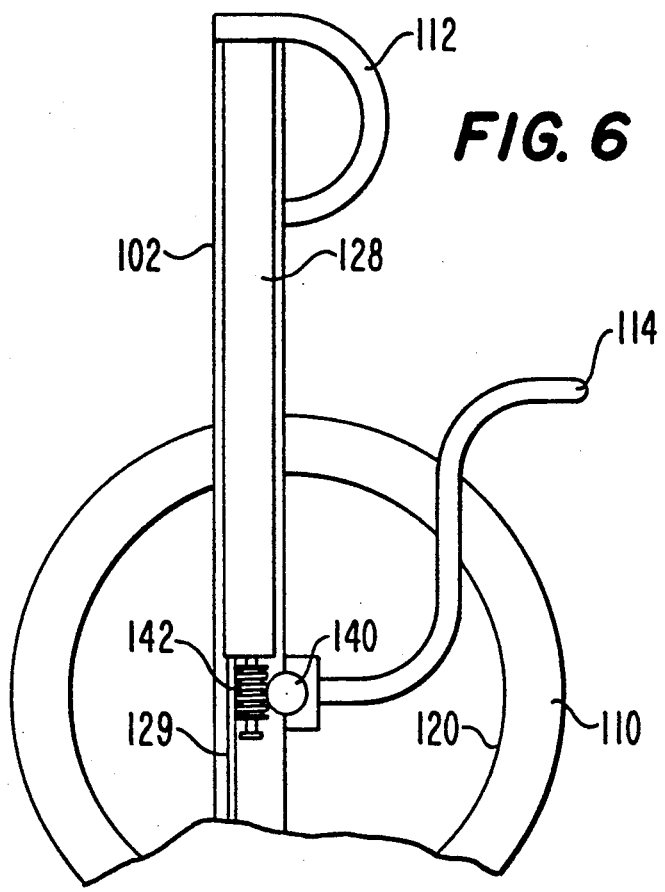
FIG. 6 illustrates one seat positioning embodiment.
Figure 7:
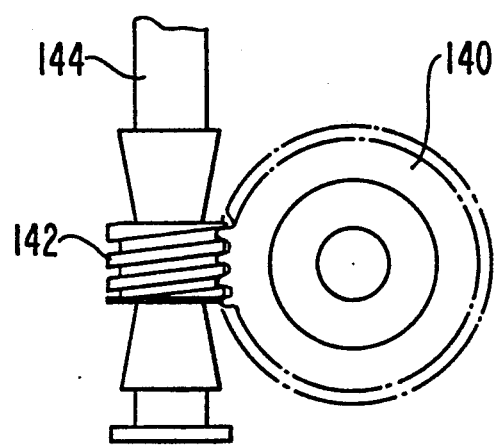
FIG. 7 illustrates details of the seat positioning embodiment of FIG. 6.

One arrangement which may be effectively used to change the seat position is shown in FIGS. 6 and 7 discussed in detail in connection with FIG. 8. However, other mechanisms which may be easily activated by the simple movement of the shift lever and handwheel as described above may also be employed. A pump 128 is connected to a gas cylinder 130 by a tube 129 and is mounted to the side of the seat support bar 102 opposite that shown in FIG. 4. Depending on the specific materials chosen to form the seat support bar, the cylinder and pump might also be mounted inside the seat support bar. If this arrangement is used, the seat slide 122 is connected to a piston (not shown) associated with the gas cylinder, preferably at the upper end 132 of the cylinder at connection point 134. As the handwheel 110 is rotated in the appropriate direction, the piston is moved upwardly toward the handle 112 by gas pumped into the cylinder. When the piston has risen to its maximum height, the seat slide will occupy the position 122'. The seat slide is lowered by rotating the handwheel 110 in the opposite direction. This releases gas from the cylinder and causes the piston to return to the position shown in FIG. 4.

Figure 5:
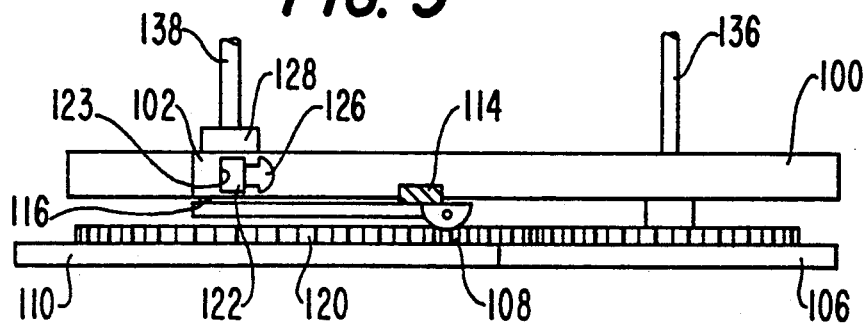
FIG. 5 is a top plan view of one side of the wheelchair frame, showing the seat retraction gearing.

FIG. 5 illustrates, in top view, the structures shown in FIG. 4, which are actuated to engage and disengage the drive gears and the seat positioning gears. The base bar 100 is shown relative to the seat support bar 102, the front wheel 106, the central drive gear wheel 108, the handwheel 110 and the handwheel gears 120. The seat slide 122 is preferably located in a channel 123 in the seat support bar so that it can slide between the desired seat positions as required. The pump 128 is mounted to the inside of the seat support bar 102 so that it is not visible from the side view of FIG. 4. The two crossbars 136, 138 that connect the right and left base bars are shown in their relative positions. The gears in FIG. 5 are shown in the engaged position. However, when the shift lever 114 is raised, the handwheel gear 120 is moved out of engagement with the gear of the central drive gear wheel 108 so that there is no driving connection between the handwheel and the drive gears. The handwheel is then free to engage the pump gear and raise the seat slide. Downward movement of the shift lever 114 will move the handwheel drive gear 120 into engagement with the central drive gear wheel 108.

FIGS. 6 and 7 illustrate, in detail, the embodiment of the seat positioning mechanism shown in FIG. 4. Structures will be designated by the same reference numerals as in FIG. 4. FIG. 6 shows the pump, but does not show the cylinder and piston used to change the seat level. It is preferred to employ a single pump 128 capable of operating two piston and cylinder assemblies. One piston and cylinder assembly, such as the cylinder 130 of FIG. 4 and its associated piston (not shown) is located on each side of the wheelchair seat. One assembly is attached to each seat support bar so that both sides of the seat are raised simultaneously by the pump. One type of pump preferred for this purpose is the Movetec Ergonomic System Pump TB/TS available from Movetec AB of Boras, Sweden. This type of pump can be installed to operate the two cylinders required to change the position of the seat most effectively. Preferred for use with the Movetec pumps are the Movetec Ergonomic System Series CX1 single-acting cylinder and piston assemblies. However, other available pumps and cylinder and piston assemblies adaptable for installation or a wheelchair and operation by a geared wheelchair handwheel as described herein may also be employed for this purpose.

In the center of the handwheel 110 is a gear 140 which is turned when the handwheel is rotated, provided that the handwheel has been moved out of engagement with the shift lever 114. The gear 140 activates a pump actuator 142, which is connected to the pump 128 by a shaft 144. Activation of the pump actuator by the gear 140 will fill the cylinder with gas, thus moving the piston (not shown) which is connected to the seat slide (122 in FIG. 4). Deactivation of the pump actuator can be accomplished by turning the gear 140 in the opposite direction. This has the ultimate effect of releasing gas from the cylinder and lowering the piston and, hence, the seat slide.

Figure 8:
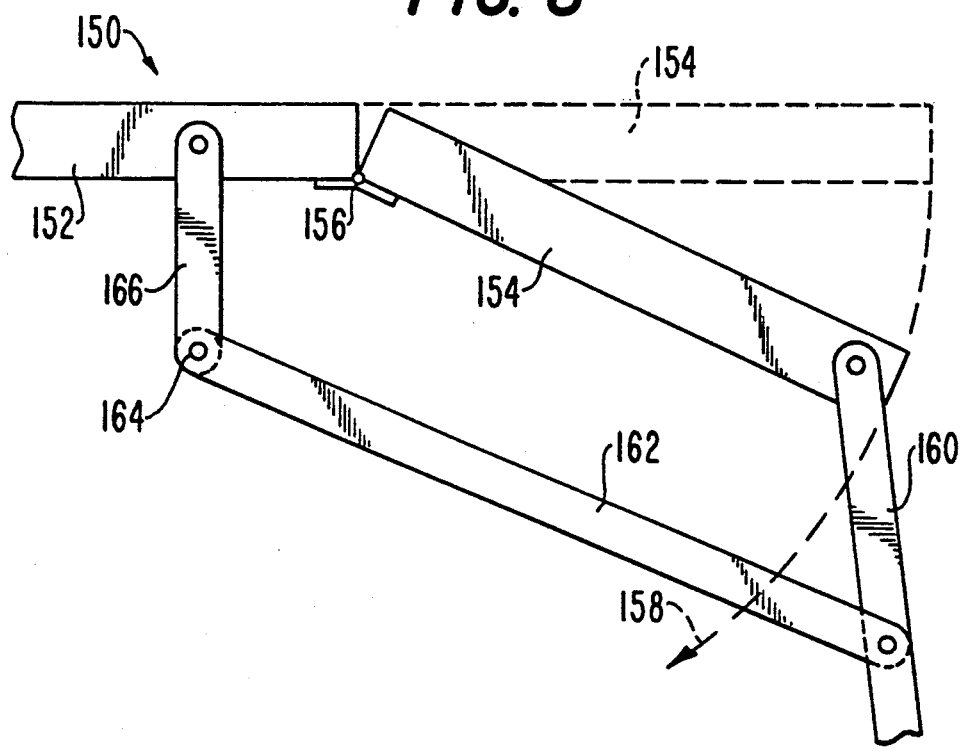
FIG. 8 is a top view of the wheelchair seat and leg rest.
Figure 9:
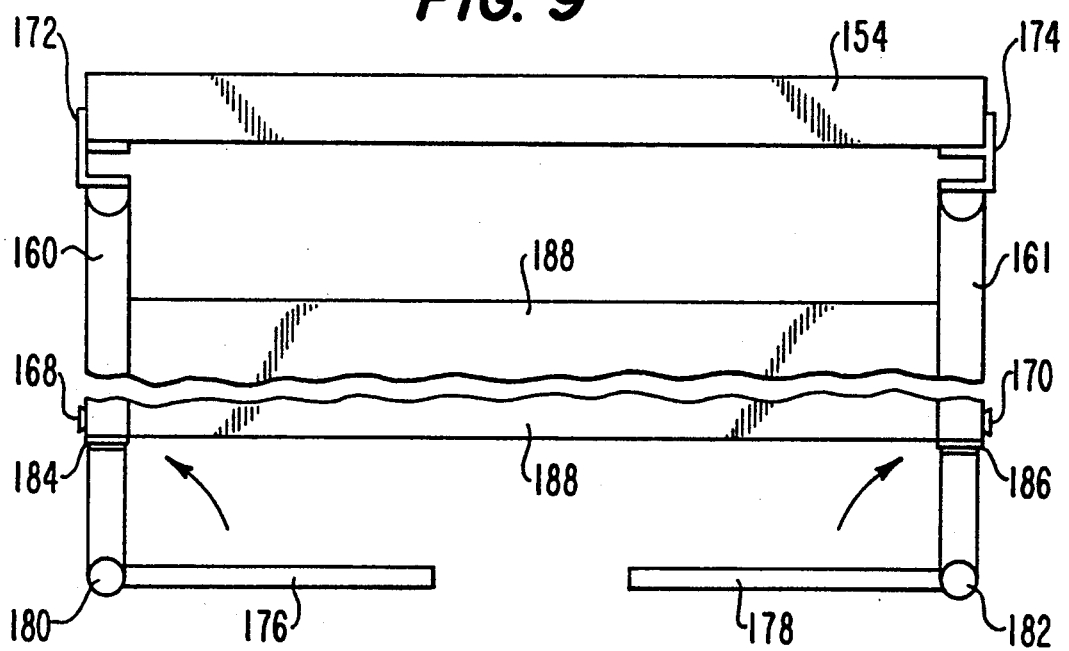
FIG. 9 illustrates, in detail, the movement of the seat and leg rest as the wheelchair is adjusted to move the occupant from a sitting to a standing position.

FIGS. 8 and 9 illustrate in top view and side view, respectively, the retraction of the seat, leg rest and foot rests as the wheelchair is changed from a position where the occupant is fully sitting to one in which the occupant is fully standing. FIG. 8 shows, in side view, how the seat and leg rest structures fold to the rear of the wheelchair and out of the way as the seat slide raises the seat upwards. The seat 150 is formed in two sections, 152 and 154. The front section 154 is pivotally connected to the rear section 152 by a hinge 156 or like member. When the seat slide is raised, the rear seat section 152 is moved toward the rear of the wheelchair, and the front seat section drops downward, generally along the path shown by the arrow 158. The leg rest support 160 is pivoted to the front seat section 154 and is secured to the underside of the rear seat section 152 by a bracket 162 that is pivoted to a seat bracket 166. This bracket may be secured to the underside of the rear seat section 152, as shown in FIG. 8, or may be an extension of the serpentine side frame 64, as shown in FIG. 1.

As the seat front section 154 and leg rest 160 are moved in the direction of the arrow 158, the knobs 168, 170 (FIG. 9) on the outer sides of the leg rest are received in slides (not shown) in the inner surfaces of the base bars. This arrangement assists in guiding the leg rests backward toward the rear of the wheelchair. The leg rest bracket 162 and the front seat section 154 will assume a substantially vertical orientation and will be located well under the rear seat section 152 when the wheelchair is in the standing position.

FIG. 9 illustrates, in front view, additional features of the leg rest and foot rest portions of the wheelchair. The wheelchair includes a left leg rest support 161 in addition to the right leg rest support 160 shown in FIG. 8. The leg rest supports are pivoted to the seat front section 154 by suitable pivotable connectors 172 and 174. Each of the leg rest supports 160, 161 terminates in a foot rest 176, 178. The foot rests 176, 178 are pivoted to the leg rest supports at 180 and 182 so that they may be moved between a position where they support the user's feet and a position where they are folded against the leg rest supports and out of the way.

The distance between the seat front section 154 and the foot rests 176, 178 can be adjusted. On each leg rest a telescoping adjuster 184, 186 is preferably provided so that the length of each leg rest support 160, 161 can be varied to suit the user's comfort. If desired, the telescoping adjuster may use the knobs 168, 170 to secure the telescoped leg rest support at the proper length, as well as to guide the leg rest into and along the slides in the base bar when the position of the wheelchair is being changed from sitting to standing and back to sitting.

The leg rest preferably also includes a padded leg rest section 188 (shown at 58 in FIG. 1) to enhance the comfort of the chair to the user.

When it is desired to fold the wheelchair, the seat is lifted off the seat support pins, and, together with the leg rest padding, is removed from the wheelchair frame to allow the frame sides to be folded together.

The seat and leg rest are preferably made of materials selected to enhance the comfort of the wheelchair user, including padding to support the user's body and legs.

Industrial Applicability

The present invention provides a lightweight, easily operated wheelchair which enables the handicapped and disabled to exercise a substantial degree of control over both travel and their position in the chair. This wheelchair, therefore, will find its primary application as the main means for mobility for handicapped, injured, disabled and others unable to walk unassisted. Hospitals, nursing homes and other institutions serving the handicapped will also find the wheelchair of the present invention to be a useful addition to the appliances and devices which these institutions maintain to serve handicapped persons.

The present invention has been described with respect to preferred embodiments. Modifications and variations of these embodiments which perform the same functions are considered to be within the scope of the present invention.

I claim:

1. A lightweight, foldable manually driven wheelchair including:
   (a) travel wheel means for propelling the wheelchair along a desired travel path;
   (b) manually activated drive gear means for controlling the direction of travel along the travel path;
   (c) manually actuated body positioning means for moving the position of the wheelchair occupant between sitting and standing positions without changing the center of gravity of the wheelchair;
   (d) shift control means shiftable between a first position in which said drive gear means can be activated and a second position in which said body positioning means can be actuated for allowing the wheelchair occupant to control selectively the direction of travel or body position of the wheelchair;
   (e) dual function handwheel means for operation by the wheelchair occupant to drive said drive gear means when said drive gear means is activated and to move said body positioning means when said body positioning means is actuated; and
   (f) foldable frame means for supporting said travel wheel means, said drive gear means, said body positioning means, said shift control means and said handwheel means in operational relationship.

2. A wheelchair as described in claim 1, wherein said travel means includes a pair of spaced pivoted travel wheels pivotally mounted on said frame means toward the rear and behind the center of gravity of the wheelchair and a pair of spaced non-pivoted travel wheels mounted on said frame means toward the front of the wheelchair.

3. A wheelchair as described in claim 2, wherein said drive gear means includes gear selector means for selecting one of a set of defined gears and drive wheel means positioned in driving relationship between the non-pivoted travel wheels and the handwheel means for engaging gears on said non-pivoted travel wheels and said handwheel means to cause said non-pivoted travel wheels to travel in the selected gear.

4. A wheelchair as described in claim 3, wherein the set of defined gears includes a "Forward Only" gear that will allow the wheelchair to travel only in a forward direction, a "Reverse Only" gear that will allow the wheelchair to travel only in a reverse direction, a "Drive" gear that will allow the wheelchair to travel in a forward direction, but will not prohibit the wheelchair from traveling in a reverse direction, and a "Park" gear that will not allow the wheelchair to move in either a forward or a reverse direction.

5. A wheelchair as described in claim 4, wherein said drive gear means is activated by manually manipulating a gear selector knob operatively connected to said gear selector means when said shift control means is in said first position.

6. A wheelchair as described in claim 3, wherein said gear selector means includes a centrally mounted rotatable ratchet, a pair of circumferentially mounted spaced rotatable cams and a pair of spring-loaded pawls pivotally mounted between said ratchet and cams, wherein said pawls are normally biased into engaging contact with said ratchet and out of contact with said cams.

7. A wheelchair as described in claim 1, wherein said body positioning means includes seat means movable between a sitting position and a standing position for supporting a major part of the occupant's body, and foldable leg support means movable between a fully supported position and a fully retracted position for supporting the occupant in a sitting position, wherein said seat means are slidably mounted in a vertical member of said frame means and said leg support means are slidably received in a horizontal member of said frame means as the seat means is moved from a sitting to a standing position.

8. A wheelchair as described in claim 7, wherein said body positioning means further includes seat movement control means for moving the seat means between the sitting and the standing position.

9. A wheelchair as described in claim 8, wherein said seat movement control means includes a movable piston attached to said seat means, said piston being actuated to move said seat means by the handwheel means when the shift control means is shifted into said second position.

10. A wheelchair as described in claim 7, wherein said seat means is articulated and includes a front section pivoted to a rear section so that when said seat means is in said standing position the front section drops downwardly and toward the back of the wheelchair.

11. A wheelchair as described in claim 8, wherein said body positioning means further includes positioning gear means positioned operatively between said handwheel means and said seat movement control means for controlling the actuation of said seat movement control means by said handwheel means.

12. A wheelchair as described in claim 11, wherein said shift control means is operatively mounted relative to said handwheel means to disengage said handwheel means from said drive wheel means and to engage said handwheel means with said positioning gear means in response to manual actuation of said shift control means by the occupant of the wheelchair.

13. A wheelchair as described in claim 9, wherein the rotation of said handwheel means by the wheelchair occupant moves the piston to move the seat from a sitting to a standing position, as desired, when said handwheel means engages said positioning gear means.

14. A wheelchair as described in claim 1, wherein said frame means includes a pair of spaced substantially horizontal base bars, each of which supports a pair of substantially vertical seat support bars, and said travel wheel means and said drive gear means are rotatably mounted on said base bars and said handwheel means is rotatably mounted and said shift control means is pivotally mounted on said seat support bars.

15. A manually driven wheelchair having a gear system that is manually actuatable to control the travel direction of the wheelchair and to drive the wheelchair along a travel surface, wherein said wheelchair includes at least one manually operated toothed gear wheel, at least one toothed and geared, non-pivoted travel wheel, and at least one toothed central drive gear wheel drivingly engaged between said manually operated gear wheel and said geared travel wheel, wherein the travel direction of said travel wheel is determined by manual activation of a gear selector operatively connected to drive gear means for driving said wheelchair in a selected gear associated with said drive gear wheel and said travel wheel to permit travel of the wheelchair only in a direction corresponding to said selected gear in response to manual operation of said manually operated gear wheel, further including seat positioning means for changing the position of a seat positioned on the wheelchair operatively associated with said manually operated toothed gear wheel, and seat position actuation means for activating said seat positioning means so that when said actuation means is actuated, the manual operation of said manually operated toothed gear wheel changes the position of the seat and does not drive the wheelchair.

16. A manually driven wheelchair including a travel gear drive system, a seat, leg support means for supporting the legs and feet of the wheelchair occupant and dual drive gear actuating and seat positioning means for controlling the travel of the wheelchair and for changing the position of the seat from a first position in which the wheelchair occupant is supported by the seat in a sitting position to a second position in which the wheelchair occupant is supported by the seat in a standing position without changing the center of gravity of the wheelchair, wherein the dual drive gear actuating and seat positioning means includes shift lever means for disengaging the travel gear drive system and engaging a seat positioning gear means for causing a front portion of the seat to pivot downwardly away from the occupant's body and the leg support means to be retracted backwardly away from the occupant's legs while simultaneously raising a back portion of the seat to a convenient height to support the occupants's buttocks while the occupant is in a standing position.

17. A wheelchair as described in claim 16, wherein said travel gear drive system includes gear selector means for selecting one of a set of four defined gears and drive wheel means positioned in driving relationship between a pair of spaced non-pivoted travel wheels and a pair of handwheels for engaging gears on said non-pivoted travel wheels and said handwheels to cause said non-pivoted travel wheels to travel in the selected gear.

18. A wheelchair as described in claim 17, wherein the set of four defined gears includes a "Forward Only" gear that will allow the wheelchair to travel only in a forward direction, a "Reverse Only" gear that will allow the wheelchair to travel only in a reverse direction, a "Drive" gear that will allow the wheelchair to travel in a forward direction, but will not prohibit the wheelchair from traveling in a reverse direction, and a "Park" gear that will not allow the wheelchair to move in either a forward or a reverse direction.

19. A wheelchair as described in claim 18, wherein said dual drive gear actuating and seat positioning means is activated by manually manipulating a gear selector knob operatively connected to said gear selector means when said shift control means is in said first position.

20. A wheelchair as described in claim 17, wherein said gear selector means includes a centrally mounted rotatable ratchet, a pair of circumferentially mounted spaced rotatable cams and a pair of spring-loaded pawls pivotally mounted between said ratchet and cams, wherein said pawls are normally biased into engaging contact with said ratchet and out of contact with said cams.

21. A wheelchair as described in claim 20, wherein said gear selector means rotates in a clockwise direction in response to manipulation of said gear selector knob.

22. A wheelchair as described in claim 16, wherein said seat is slidably mounted in a vertical member of a frame portion of the wheelchair and said leg support means is slidably received in a horizontal member of said frame as the seat is moved from said first to said second position.

23. A wheelchair as described in claim 16, further including a movable piston attached to said seat, said piston being actuated to move said seat by the dual drive gear actuating and seat positioning means when said seat positioning gear means is engaged.

24. A wheelchair as described in claim 23, wherein the rotation of said dual drive gear actuating and seat positioning means by the wheelchair occupant moves the piston to move the seat from a sitting to a standing position, as desired, when said handwheel means engages said positioning gear means.

25. A wheelchair as described in claim 22, wherein said frame portion includes a pair of spaced substantially horizontal base bars, each of which supports a pair of substantially vertical seat support bars, and said travel gear drive system is rotatably mounted on said base bars and said dual drive gear actuating and seat positioning means is rotatably mounted and said shift lever means is pivotally mounted on said seat support bars.

26. A manually driven wheelchair including handwheel means for manually driving the wheelchair, a seat with a front seat section pivotally connected to a back seat section, leg support means for supporting the legs and feet of the wheelchair occupant and manual seat positioning means for changing the position of the seat from a first position in which the wheelchair occupant is supported by the seat in a fully seated position to a second position in which the wheelchair occupant is supported by the seat in a standing position without changing the center of gravity, wherein the seat positioning means is manually actuated to cause said front seat section to pivot downwardly and away from the occupant's body and the leg support means to be retracted backwardly away from the occupant's legs while simultaneously raising said back seat section to a convenient height to support the occupant's buttocks while the occupant is in a standing position.

27. A manually driven wheelchair as described in claim 26, wherein said manual seat positioning means includes seat position actuation means mounted on said wheelchair in operative association with said handwheel means for movement by the wheelchair occupant to actuate and de-actuate said seat positioning means and seat movement control means mounted on the wheelchair in operative association with said handwheel means for moving the seat between said first and second positions, wherein the movement of said seat position actuation means to actuate the seat positioning means causes said handwheel means to engage said seat movement control means so that the operation of the handwheel means moves the seat between said first and second positions and does not drive the wheelchair.

28. A manually driven wheelchair as described in claim 27, wherein said seat movement control means includes at least one piston movable within a gas-containing cylinder and said seat is operatively connected to said piston so that the movement of said handwheel causes said piston and said seat to move between said first and second positions.

29. A manually driven wheelchair as described in claim 28, wherein said seat movement control means further includes pump means for filling said cylinder with gas to raise said piston and said seat position actuation means includes seat position gear means operatively positioned between said handwheel means and said pump means for actuating said pump means.

30. A manually driven wheelchair as described in claim 29, wherein said seat position actuation means further includes shift lever means pivotally mounted on said wheelchair proximate to the wheelchair occupant's hand for shifting said seat position gear means into operative contact with said handwheel means so that the movement of said handwheel causes said seat position gear means to actuate said pump means.

31. A wheelchair comprising:
(a) a travel surface contacting wheel mounted for rotation in a forward and a reverse direction;
(b) direction control gear means mounted for operative association with said travel surface contacting wheel, said direction control gear means operating in a normal operational mode to permit said surface contacting wheel to rotate in both the forward and reverse directions and in a restrictive operational mode to restrict the rotation of said surface contacting wheel in at least one direction; said direction control gear means including a central toothed ratchet gear mounted to rotate with said travel surface contacting wheel and including a first row of teeth directed in a first direction and a second row of teeth directed in a second opposite direction, a pair of pivoted pawls mounted to engage the teeth of said toothed ratchet gear, one of said pawls being biased into engagement with said first row of teeth to prevent rotation of said ratchet gear in a clockwise direction and the other of said pawls being biased into engagement with said second row of ratchet teeth to prevent rotation of the ratchet gear in a counterclockwise direction,
(c) mode selector means operable by a wheelchair occupant to select the desired operational mode;
(d) selection transmission means connected between said direction control gear means and said mode selector means and operative to control said direction control gear means in response to the operational mode selection made by said mode selector means, and
(e) cam means operatively connected to said selection transmission means for moving one or both of said pawls out of engagement with said ratchet gear teeth in response to selections made by said mode selector means, said cam means including spaced cams and a rotatable selector plate means supporting said spaced cams, which is connected to said selection transmission means, said cams operating in response to the rotation of said selector plate means to selectively engage and remove one or both of said pivoted pawls out of engagement with said ratchet teeth, both of said pivoted pawls being left in engagement with said ratchet teeth in at least one rotational position of said selector plate means.

32. A wheelchair as described in claim 31, wherein said mode selector means may be activated to select at least four different modes, said modes comprising Forward Only, wherein said wheelchair can be driven only in a forward travel direction; Reverse Only, wherein said wheelchair can be driven only in a reverse travel direction; Drive, wherein said wheelchair can be driven in a forward direction but is not prevented from moving in a reverse direction; and Park, wherein said wheelchair is prevented from traveling in both a forward and a reverse direction.

33. A directional control system for a wheelchair to be operatively associated with at least one of the wheels of the wheelchair and controllable by the wheelchair occupant to selectively control and restrict the travel of the wheelchair, wherein said directional control system includes:
(a) mode selector means for selecting at least four different operational modes, said modes comprising a Forward Only mode, wherein said wheelchair can be driven only in a forward travel direction; a Reverse Only mode, wherein said wheelchair can be driven only in a reverse travel direction; a Drive mode, wherein said wheelchair can be driven in a forward direction but is not prevented from moving in a reverse direction; and a Park mode, wherein said wheelchair is prevented from traveling in both a forward and a reverse direction;
(b) directional control gear means adapted to be operatively geared to said at least one wheel for controlling the rotation of said wheel; and
(c) mode selection transmission means for transmitting the selected operational mode to the directional control gear means, said directional control gear means including a toothed ratchet gear mountable for rotation with said wheelchair wheel, a pair of pivoted pawls spring biased and mountable to engage the teeth of said ratchet gear, spaced cam means operative to move said pawls out of engagement with said teeth in response to operational modes selection made by said mode selection transmission means, and rotatable selector plate means connected to said mode selection transmission means for rotation thereby, said cam means being mounted on said selector plate means, the selector plate means being mountable to position said cam means for selective engagement with said pivoted pawls.

34. A directional control system for a wheelchair as described in claim 33 wherein said toothed ratchet gear includes a first circumferential row of teeth inclined in a first direction and a second circumferential row of teeth inclined in a second, opposite direction.

35. A directional control system for a wheelchair as described in claim 34, wherein one of said pawls is adapted to engage said first row of teeth and prevent rotation of the ratchet gear in a clockwise direction and the other of said pawls is adapted to engage said second row of teeth and prevent rotation of the ratchet gear in a counterclockwise direction.

36. A directional control system for a wheelchair as described in claim 35, wherein said mode selector means and said selector plate means rotate only in a clockwise direction, and the clockwise rotation of said mode selector means to select a mode causes said selector plate means to rotate clockwise so that the cam means position the pawls into or out of engagement with the ratchet gear teeth to allow rotation of the wheel as required to control the wheelchair in the selected mode.

37. A wheelchair for transporting an occupant
a structural frame;
wheelchair support wheels mounted for rotation on said frame;
seat means including an occupant supporting seat, said occupant supporting seat being articulated and including a rear section and a front section pivoted to said rear section,
mounting means associated with said frame and said seat means for mounting said seat means on said frame, said seat means including drive means mounted to drive said occupant supporting seat for movement relative to said frame between a lowermost position relative to said wheels and an uppermost position spaced above said lowermost position, said drive means including a drive mechanism for operation by said wheelchair occupant to control said drive means, said front section of said occupant supporting seat extending outwardly in a plane of said rear section in the lowermost position of said occupant supporting seat, the front section of said occupant supporting said pivoting downwardly from said rear section as said occupant supporting seat moves from the lowermost to the uppermost position; wherein said seat means operates to move an occupant of said wheelchair between a sitting position in said lowermost position of said occupant supporting seat and a standing position in said uppermost position of said occupant supporting seat, and said seat means includes foldable leg support means movable between an extended position for supporting an occupant in a sitting position and a retracted position to facilitate support of an occupant in a standing position.

38. The wheelchair of claim 37 wherein said frame includes upright frame means extending upwardly beyond said support wheels and transverse frame means extending below said occupant supporting seat in a plane substantially transverse to said upright frame means, said mounting means slidably mounting said occupant supporting seat in said upright frame means and said leg support means in said transverse frame means.

39. The wheelchair of claim 37 wherein said drive mechanism is a hand driven unit operated by said wheelchair occupant to power said drive means.

40. The wheelchair of claim 39 wherein said drive means includes positioning gear means driven by said drive mechanism.

41. The wheelchair of claim 39 wherein said drive mechanism is a rotatable handwheel.

42. The wheelchair of claim 37 wherein said leg support means is pivotally connected to the front section of said occupant supporting seat.

43. The wheelchair of claim 37 wherein said drive means includes a piston unit having a piston connected to said occupant supporting seat and a fluid containing cylinder, said piston being movable within said cylinder, said hand driven unit being connected to operate said piston unit to move said occupant supporting seat between said lowermost and uppermost positions.

44. The wheelchair of claim 43 wherein said drive means includes pump means operable by said hand driven unit to selectively supply fluid to the cylinder of said piston unit or to withdraw fluid from said cylinder.

45. The wheelchair of claim 39 wherein a wheelchair propulsion means is mounted upon said frame and connected to propel at least one of said wheelchair support wheels, when power is supplied to said wheelchair propulsion means, and shift control means mounted upon said frame and operable to cause said hand driven drive mechanism to provide power to either said drive means or said wheelchair propulsion means.

46. The wheelchair of claim 45 wherein said wheelchair propulsion means includes manually actuatable means operable to prevent movement of said wheelchair support wheels in either a forward or rearward direction.

* * * * *